United States Patent
Gallart et al.

(10) Patent No.: US 6,187,350 B1
(45) Date of Patent: *Feb. 13, 2001

(54) COMBINATION CONFECTIONARY PRODUCT

(75) Inventors: Ramon Escola Gallart, Sant Cugat del Valles; Ramon Bayes Turull, Barcelona, both of (ES)

(73) Assignee: Zeta Espacial S.A. (ES)

(*) Notice: Under 35 U.S.C. 154(b), the term of this patent shall be extended for 0 days.

This patent is subject to a terminal disclaimer.

(21) Appl. No.: 08/873,678

(22) Filed: Jun. 12, 1997

(51) Int. Cl.[7] ........................................ A23G 3/00

(52) U.S. Cl. .................. 426/91; 426/103; 426/104; 426/115; 426/134; 426/138

(58) Field of Search .................. 426/104, 112, 426/115, 130, 134, 91, 103, 138; 401/52, 195; 132/318; 206/216

(56) References Cited

U.S. PATENT DOCUMENTS

| | | | | |
|---|---|---|---|---|
| D. 359,607 | * | 6/1995 | Yun | 426/115 |
| 1,593,858 | * | 7/1926 | Venable | 426/134 |
| 1,847,415 | * | 3/1932 | Snell | 426/134 |
| 2,096,611 | * | 10/1937 | Ellestad | 426/134 |
| 2,151,282 | * | 3/1939 | Stamp | 426/134 |
| 2,156,482 | * | 5/1939 | Roob | 426/104 |
| 2,190,231 | * | 2/1940 | Craddock | 426/104 |
| 2,402,072 | * | 6/1946 | Nehrke | 132/318 |
| 2,626,847 | * | 1/1953 | Brown | 401/52 |
| 2,698,802 | * | 1/1955 | Boon | 426/104 |
| 2,728,932 | * | 1/1956 | Ramsey, Sr. | 401/52 |
| 2,834,685 | * | 5/1958 | Ferguson | 426/134 |
| 2,963,147 | | 12/1960 | Stagner . | |
| 2,980,039 | * | 4/1961 | Jolly | 426/134 |
| 3,138,249 | * | 6/1964 | Paulini | 426/104 |
| 3,706,354 | | 12/1972 | Gruska | 401/78 |
| 4,023,912 | * | 5/1977 | Mahler et al. | 426/115 |
| 4,794,008 | * | 12/1988 | Schmidt et al. | 426/130 |

(List continued on next page.)

FOREIGN PATENT DOCUMENTS

| | | | |
|---|---|---|---|
| 4141727 | * | 7/1993 | (DE) ...... 426/134 |
| 295 11 712 U | | 11/1995 | (DE) . |
| 296 07 116 U | | 9/1996 | (DE) . |
| 0178188 | | 4/1986 | (EP) . |
| 2469362 | | 5/1981 | (FR) . |
| 262005 | | 12/1926 | (GB) . |
| 1362764 | * | 8/1974 | (GB) ...... 426/134 |
| 2093433 | * | 9/1982 | (GB) ...... 426/134 |
| 62-36151 | * | 2/1987 | (JP) ...... 426/104 |
| 62-220150 | * | 9/1987 | (JP) ...... 426/104 |
| 76242 | * | 2/1950 | (NO) ...... 132/318 |
| 100783 | * | 5/1994 | (PT) ...... 426/104 |

OTHER PUBLICATIONS

Topps Co. Pamphlet, Topps Co. Brooklyn, N.Y. Dec. 1993.*
The Confectioner 77(1–2) May 1992 p. 14 (Dialog Abstract).*

Primary Examiner—Steven Weinstein
(74) Attorney, Agent, or Firm—Steinberg & Raskin, P.C.

(57) ABSTRACT

A confection including a candy product, a substantially elongate base member having opposed first and second ends and an interior compartment. The first end of the base member has an opening leading to the interior compartment while the second end of the base member has support and retaining structure for supporting and retaining the candy product in a fixed position relative to the base member. A cap removably engages with the base member at the second end and encloses the candy product when in engagement with the base member. A sealing member close the opening at the first end of the base member to thereby seal the interior compartment thereof. A small toy may be placed in the interior compartment and is accessible by removing the sealing member from engagement with the base member. The candy product or mass may have a plurality of different tastes and/or a plurality of different colors.

12 Claims, 3 Drawing Sheets

U.S. PATENT DOCUMENTS

| | | | |
|---|---|---|---|
| 4,914,748 | * | 4/1990 | Schlotter et al. ................... 426/104 |
| 4,992,283 | * | 2/1991 | Shorey ................................ 426/104 |
| 5,007,756 | * | 4/1991 | Wey ..................................... 401/52 |
| 5,009,535 | * | 4/1991 | Oilar .................................... 401/195 |
| 5,066,502 | * | 11/1991 | Eales ................................... 426/134 |
| 5,273,528 | * | 12/1993 | Skeen et al. ........................ 401/195 |
| 5,302,403 | * | 4/1994 | Cook et al. ......................... 426/134 |
| 5,370,219 | * | 12/1994 | Violett ................................. 426/115 |
| 5,531,318 | * | 7/1996 | Coleman et al. .................... 426/115 |
| 5,549,405 | * | 8/1996 | Krahn .................................. 401/52 |

* cited by examiner

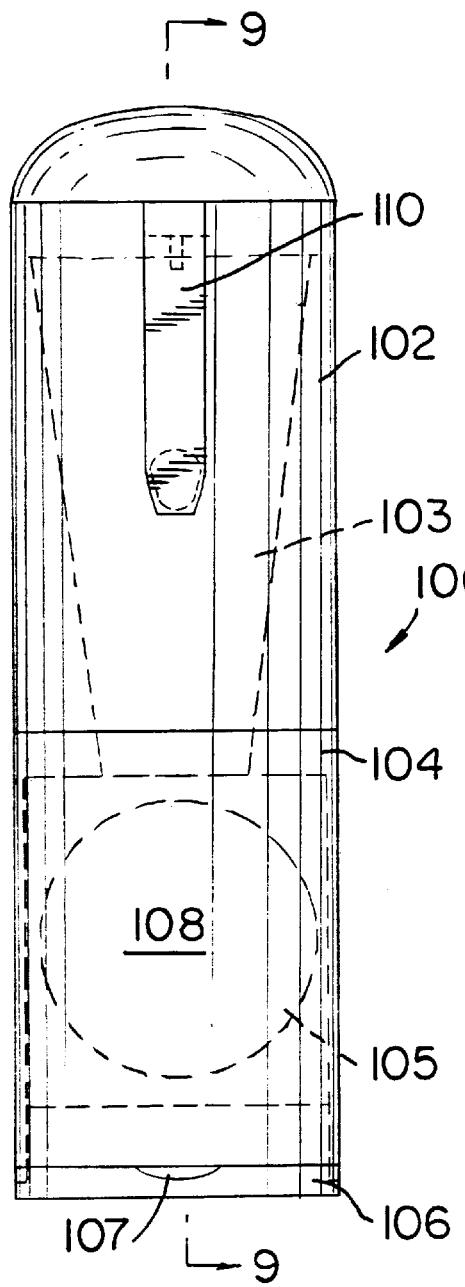
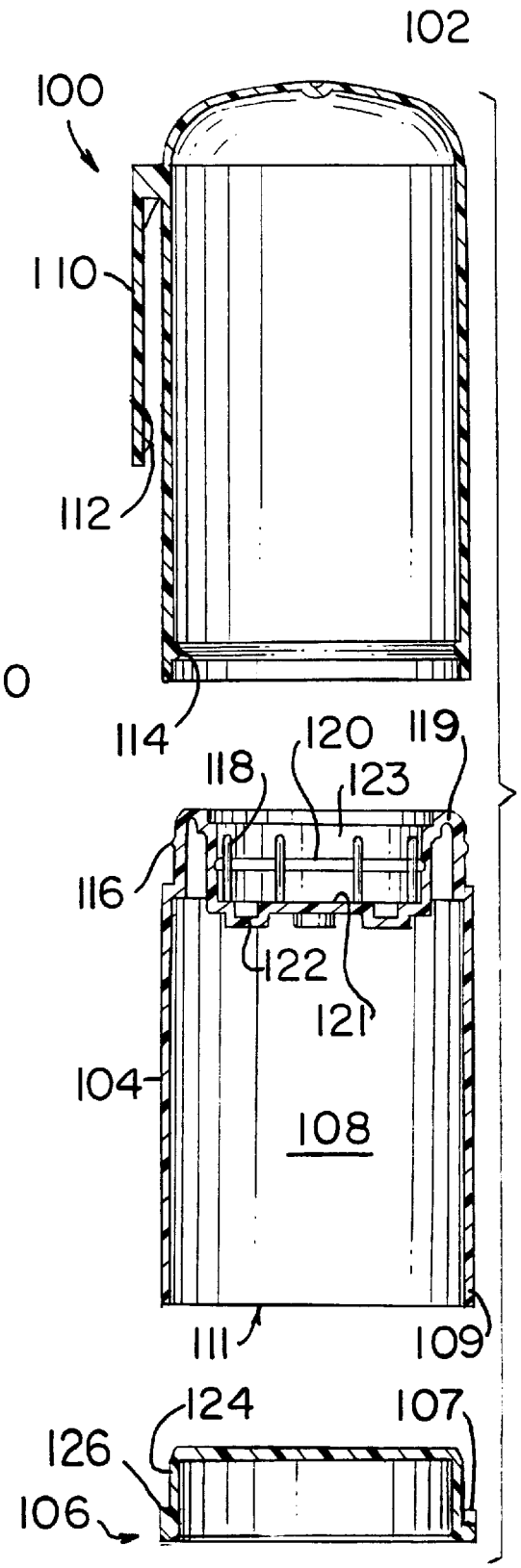
FIG. 8
FIG. 9

COMBINATION CONFECTIONARY PRODUCT

FIELD OF THE INVENTION

The present invention relates to a confectionary product including a plastic base having a hollow interior compartment accessible at one end of the base and a support and retaining structure for a candy mass at an opposite end of the base. A cover removably engages with the base at the end at which the candy mass is situated to enclose the candy mass and a cap removably engages with the base at the opposite end to seal the hollow interior compartment. The candy mass may be a solid product formed upon solidification of a liquid candy or confectionary material.

The present invention also relates to a candy product having a hollow cavity that can be filled up with different kinds of candy so that a combination of different candy items can be provided in a single confection. More particularly, the invention relates to a transparent sweet or candy having a base with a substantially cylindrical or conical shape and a hollow cavity in its interior which is filled up with another confectionery product, such as concentrated syrup with strawberry flavor or any other flavor, or particles of bubble gum, or small pieces of gasified candy. The upper part of the sweet is covered by a cap, also made of a transparent candy material, and may have the same color and taste as the cylindrical base, or a different color or taste.

Further, the present invention relates to a confection having a two-part detachable housing and a candy product arranged within the housing. The housing is at least partially transparent to enable viewing of the candy product therein through the housing while the housing is in a closed position. The candy product described above may be incorporated into the housing.

BACKGROUND OF THE INVENTION

Candies can be manufactured by a variety of different manufacturing processes. One particular manufacturing process is the die-system technique. As a result of the steps in this process, candy manufactured by this process is opaque and, if ever provided with a hollow interior space or cavity, the contents of the hollow cavity cannot be distinguished through the opaque surrounding material. In fact, there are several products with such characteristics on the market, and due to their opaqueness, the contents of the hollow cavity must be indicated on the wrapper.

Confections filled with gasified caramel and processes for obtaining the same are known. For example, U.S. Pat. No. 5,279,842 describes a process for obtaining a confection filled with gasified caramel and a confection obtained thereby in which an initial caramel mass is at a temperature of between 90° C. and 150° C. and at a degree of moisture below equilibrium moisture of the resulting gasified caramel. Essences and/or colorants are added to the mass and the mass is then deposited in complementary molds. Cavities having a volume of 0.2 to 20 ml are stamped in the two parts of the caramel mass deposited in the complementary molds and the complementary molds are then cooled to a temperature below about 50° C. Chips of gasified caramel, and possibly bubble gum particles, and placed into the cavities formed in the complementary molds. An adhesive is applied to the parts of the caramel mass deposited in the complementary molds and the caramel mass parts are then joined together. The resulting caramel product is then removed from the molds. To provide a lollipop structure, a stick may be inserted into connection with one of the caramel masses when it situated in the respective mold. The gasified caramel situated in the interior cavity of the caramel mass is protected from moisture.

One particular confectionary product of interest is a candy called a "PUSH POP", distributed by, e.g., Topps Ireland. This Push Pop is a solid mass of one color candy housed in a two-part detachable plastic container. As its name implies, the candy mass is retained on a slidable member within the housing and thus can be pushed up from the housing to extend beyond the housing a desired distance as needed for licking by the child. The candy product is freely slidable within the housing which is opaque and prevents viewing of the candy product. It is a problem with this product that as the candy mass is converted into a liquid state, i.e., as it is being licked, some of the liquid may drip onto the slidable member and prevent the sliding motion of the candy mass. Also, the continual movement of the candy mass into and out of the housing is detrimental to the cleanliness of the candy product and potentially increases the manufacturing costs of the same.

OBJECTS AND SUMMARY OF THE INVENTION

It is an object of the present invention to provide a new candy and confectionary product in which a solid candy mass is securely retained in a holder or base which also includes an accessible, interior compartment in which a small item such as a toy can be placed.

It is another object of the present invention to provide a new and improved confection which is more pleasing and attractive to the primary intended consumers of confections, i.e., children.

It is yet another object of the invention to provide a confectionary product similar to the prior art "Push Pop" but without certain disadvantages thereof.

It is another object of the present invention to provide a new and improve confection in connection with which it is possible to have several different candy products in a single confection, e.g., candy and concentrated syrup, candy and bubble gum, candy and popping candy (gasified caramel). As such, it will be possible to purchase only a single confectionary product and obtain several different confectionary and candy products.

It is another object of the present invention to provide a new cylindrical confection whereby the confection has a cylindrical base which provides one distinct taste and has a hollow internal cavity in which another candy product is situated and provides a different distinct taste.

It is another object of the present invention to provide a candy which has a transparent outer wall and an interior hollow cavity which is filled with a candy or confectionary product so that the candy or confectionary product in the hollow cavity is viewable through the outer wall. As such, it is not absolutely necessary to indicate the contents of the hollow cavity on the outer packaging since the contents of the hollow cavity can be viewed (provided the wrapping is somewhat transparent to provide an unobstructed view of the interior hollow cavity.

It is another object of the present invention to provide a new and improved confection housing which enables viewing of the contents of the confection situated within the housing without having to physically open the confection.

To obtain these objects and others, the confection in accordance with the invention generally comprises a housing and a candy product arranged within the housing. In one basic embodiment, the housing comprises a substantially cylindrical base or holder member made, e.g., of plastic, and having an interior compartment, an opening at one end leading into the interior compartment and a support and retaining structure at the opposite end. The candy mass or product is placed into connection with the support and retaining structure to fixedly attach the candy mass to the base. A sealing member or plastic tap removably engages with the open end of the base to close the opening and thus the interior compartment. A small toy of interest to a child may at least initially be placed in the compartment for sales purposes. The candy mass is covered by a cover which is preferably at least partially transparent to enable viewing of the candy mass and engages with the base at the end at which the support and retaining structure is situated. The candy mass is preferably a solid mass formed by the solidification of a liquid material which is brought into connection with the support and retaining structure of the base while in a liquid state to enable the candy mass to be embedded in connection with projections and orifices of the support and retaining structure upon solidification of the candy mass. The candy mass may have several different colors and/or several different tastes to appeal to children.

In another embodiment, the candy product comprises a substantially cylindrical base constituting a first candy component and having a hollow cavity along its central axis. The hollow cavity may have different shapes and ideally contains other candy/confectionary products that may be liquid or solid. An upper surface of the cylindrical base, to which the hollow cavity opens, is covered by a candy cap, i.e., a cap made from a candy or confectionary substance, which has outer edges dimensioned to be slightly smaller than the outer edges of the cylindrical base of the candy product. This dimensioning avoids possible damage to the child's tongue that could arise from sharp candy edges if the cap overlies the edges of the base. The cap serves to close the cavity in the base and prevent the confectionary product contained in the cavity from coming into contact with air or moisture until it is consumed.

The first candy component, i.e., the cylindrical base, is preferably transparent so that it allows a clear view at the contents of the cavity therein. It is pointed out that the technology for the elaboration of the products having such characteristics is very complicated and requires dedicated machine equipment, as such machines are not yet commercially available since machine fabricators only make machines for the manufacture of certain type of simple, deposited candies and it has not yet been developed to make the outer wall from a material which is transparent. The difficulty of making a hollow cavity along the central axis of the cylindrical base of the confection in accordance with the invention and the dosification of the additional product to fill up the hollow cavity are other problems to be added to the manufacture of a deposited candy. Moreover, filling up the cavity with small pieces of a gasified candy is a specific difficulty, as gasified candy is a highly hygroscopic product that easily deteriorates upon contact with temperature and humidity. An additional difficulty is the closing of the hollow cavity of the cylindrical candy by means of a small transparent candy cap.

Nevertheless, it is pointed out that manufacturing techniques and technology are available at present to make a candy called a "PUSH POP", distbuted by Topps Ireland. This Push Pop is a solid mass of one color candy housed in a two-p detachable plastic container. As its name implies, the candy mass can be pushed up from the housing a desired distance as needed. The candy product is freely slidable within the housing which is opaque and prevents viewing of the candy product.

The candy which is the subject matter of certain embodiments of the present invention may have different shapes and characteristics that are visible from the outside, thus allowing the child to select the type of candy he or she desires, and the indications on the candy wrapper cannot or should not lead to confusion for the child because of any misleading design or description.

The basic parts of the candy product which is the subject matter of several embodiments of the present invention are a cylindrical or slightly conical base having a hollow cavity along its central axis, the base being made from a compound or substance that renders the base transparent, the central hollow cavity may have different shapes, be filled up with different products like syrup, chocolate, small pieces of popping candy, small pieces of bubble gum, liquid bubble gum, etc., and a cap on the top of this cylindrical candy base which has a flat or curved surface that may have the same or a different color and the same or a different taste in comparison to the cylindrical base. The entire candy product is situated in a two-part detachable housing.

In another embodiment of the confection in accordance with the invention, the confection comprises a housing including a holder member and a cap member removably coupled to the holder member, and a candy product arranged within the housing. The base is fixedly secured to the holder member such that movement thereof relative to the holder member is prevented. The cap member is adapted to cover the candy product and is preferably transparent. The candy product situated in this housing may be any type of candy product as well as the candy product with the hollow cavity described above. Thus, it should be recognized that the candy product in this confection may be solid without any hollow cavity and/or a one-piece candy product.

BRIEF DESCRIPTION OF THE DRAWINGS

The following drawings are illustrative of embodiments of the invention and are not meant to limit the scope of the invention as encompassed by the claims.

FIG. 8 is a side view of the housing for another embodiment of a candy product in accordance with the invention including a cap and a sealing member situated in conjunction with the holder.

FIG. 9 is an exploded, cross-sectional view of the candy product shown in FIG. 8 taken along the line 9—9 in FIG. 8.

DETAILED DESCRIPTION OF THE INVENTION

Figure 1:
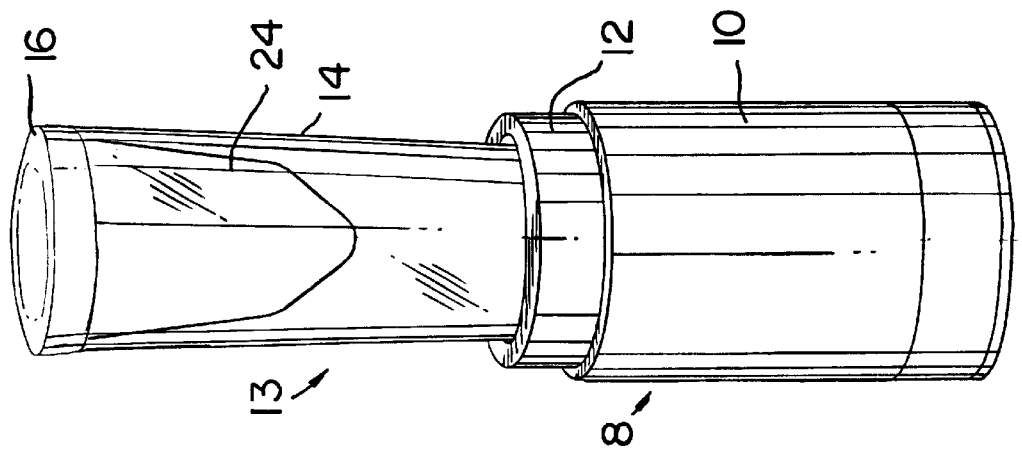
FIG. 1 is a perspective view of a holder member of a housing having a first embodiment of a candy product in accordance with the invention arranged in connection therewith.

Referring to the accompanying drawings wherein the same reference numerals refer to the same or similar elements, FIG. 1 shows a confection 8 in accordance with the invention which comprises a confection housing including a holder member or plastic container 10 and a candy product 13 arranged in connection with the plastic container 10, e.g., fixedly secured at its lower region to the material of the plastic container 10 to prevent movement of the candy product relative to the container 10. The candy product 13 includes a substantially elongated base section 14 having a hollow cavity 24 in an upper region thereof opening into the top surface of the base 14 so that the cavity 24 is open at the upper surface of the base 14, and a flat, disc-shaped cap section 16 engaging with the top of the base 14 to cover and close the cavity 24. The peripheral edges of the lower surface of the cap 16 are adapted to be slightly smaller than the peripheral edges of the upper surface of the base 14. During fabrication of the confection 8, a candy product is placed in the cavity 24, the cap section 16 is placed over the cavity 24 to close the same and the edges of the cap section 16 are stuck to the base 14 so that the cavity 24 is no longer accessible.

The base 14 is made from an edible confectionary material and the cap 16 is also made from an edible confectionary material and can be provided with a different color and/or different taste than the color and taste of the base 14 so that a variety of different flavors appealing to the child's taste and appearances appealing to the child's eyes are possible. The incorporation of the color and taste into the confectionary material that will form the base 14 and cap 16 can be performed by any known flavoring and coloring process in the art.

In certain embodiments, the base 14 is made from materials so that it is transparent to enable viewing of the cavity 24 therein and more importantly, of the candy product placed in the cavity 24.

Figure 3:
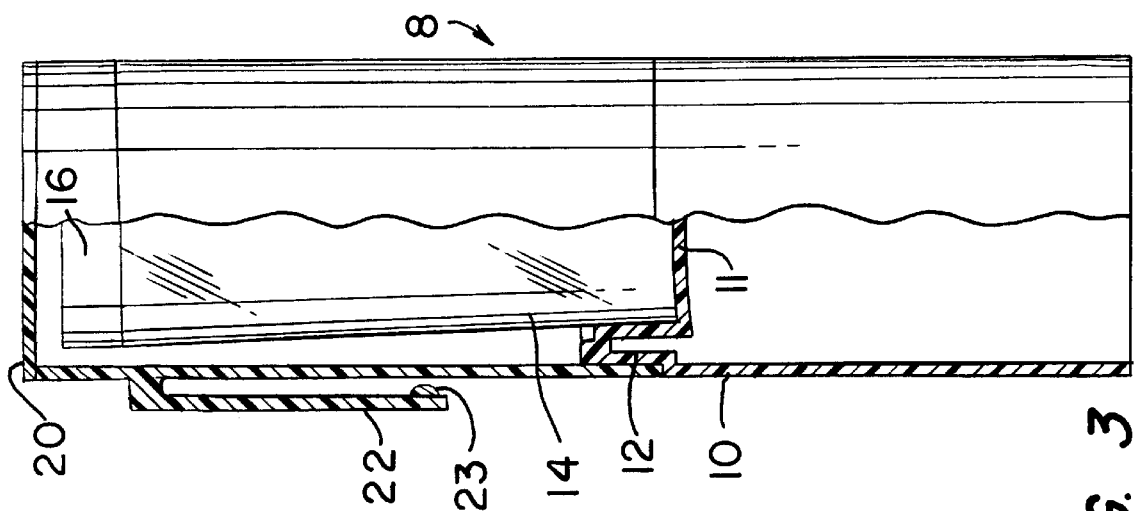
FIG. 3 is a partial cross-sectional view of the housing for a candy product in accordance with the invention taken along the line 3—3 of FIG. 2.
Figure 2:
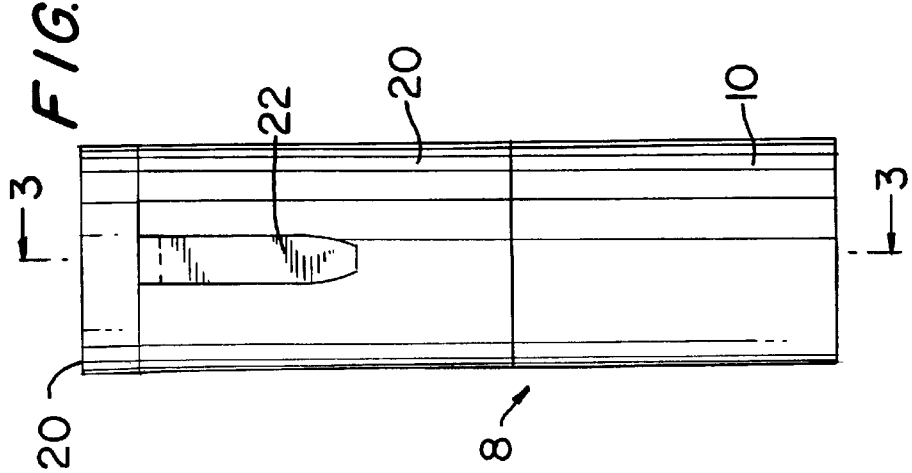
FIG. 2 is a side view of the housing for a candy product in accordance with the invention including a cap member situated in conjunction with the holder member.

As shown in FIGS. 2 and 3, the confection 8 further includes a plastic cap 20 cooperating with the plastic container 10 to cover the candy product 13 when the candy product 13 is not being eaten. The lower end of the plastic cap 20 is designed to fit around a protrusion 12 on the upper end of the plastic container 10. The cap 20 includes attachment means such as a clip 22 which enables the confection 8 to be attached, e.g., to a shirt pocket of a child. Alternatively, the container 10 or clip 22 can be provided with an orifice and a closed string passing through the orifice, in which case, the child can hang the confection 8, e.g., around his or her neck. The clip should include a small protuberance 23 on a side facing the container 10 to prevent the confection 8 from falling when, e.g., attached to a child's pocket.

Also as shown in FIG. 3, for securing purposes, the base 14 of the candy product 13 is fixed directly to a lateral wall 11 of the plastic container 10. Although it is possible to make the base 14 cylindrical, in this embodiment, the base 14 is not exactly cylindrical but rather is slightly conical, i.e., the diameter of the top surface of the base 14 is somewhat larger than the diameter of the lower surface of the base 14. The internal part of the protrusion 12 is provided with several grooves in order to achieve a firm embedding of the lower part of the cylindrical candy base 14 in the holder or container 10. Further, the plastic lateral wall 11 includes several small orifices in order to allow the lower part of the cylindrical candy base 14 to adhere firmly thereto. Thus, it will be appreciated that the candy base 14 is firmly fixed to the container 10 which is held by the child, via the lateral wall 11, without sliding or moving parts. This firm, fixed attachment enables the cap 20 to be removed from engagement with the container 10 without problems of the cap 20 adhering to the container 10, as occurs in prior art candy products such as the Push Pop described above.

The cap 20 can be opaque or clear (transparent) in which case it further facilitates viewing of the candy product 13 within the confection 8. In this embodiment, the cap 20 is transparent. Further, in the embodiment shown in FIGS. 2 and 3, the base 14 is solid without a hollow cavity. However, a cap 16 is attached to the upper surface of the base 14. The cap 16 may be made of a different confectionary material than the base 14, i.e., with a different color and/or taste, or the same confectionary material. In view of the transparency of the cap 20, it is possible to view at least the cap 16 therethrough and preferably the cap 16 and at least a portion of the base 14 therethrough. In the event that the base 14 is not solid but rather transparent and including a filled hollow cavity, it would be possible to see the contents of the cavity 24 through the transparent base 14 and the transparent cap 20.

The cavity 24 in the base 14 of the candy product in accordance with the invention can have a variety of different shapes and sizes and overall configurations. Several preferred configurations of the cavity 24 are described below.

Figure 7:
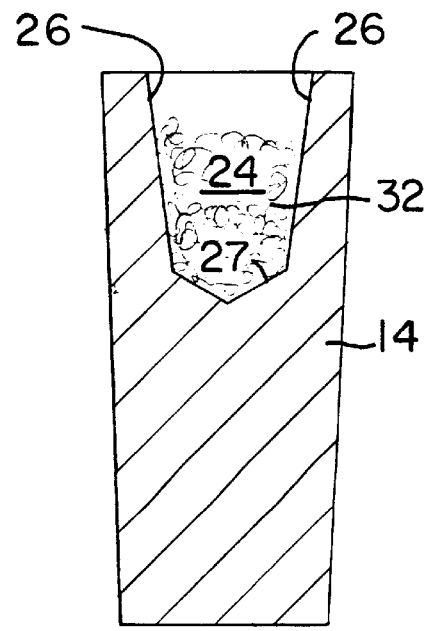
FIG. 7 is a cross-sectional view of the first embodiment of a candy product in accordance with the invention removed from the holder as shown in FIG. 1.

The cavity 24 in the base 14 of the candy product 13 shown in FIG. 1 and FIG. 7 includes a first downwardly oriented conical surface 26 extending from the top of the base 14 to an interior location of the base 14 (as a truncated cone) and a second downwardly oriented conical surface 27 beginning at the location at which the first conical wall 26 terminates and ending at a point (a full cone). The cavity 24 can be filled with different products such as small pieces of popping candy 32 and/or syrup, chocolate, small pieces of popping candy, small pieces of bubble gum, liquid bubble gum, and other similar confectionary items. The cavity 24 is preferably arranged along the central axis of the base 14, i.e., the conical surfaces 26 and 27 have the same central axis as the base 14.

Figure 4:
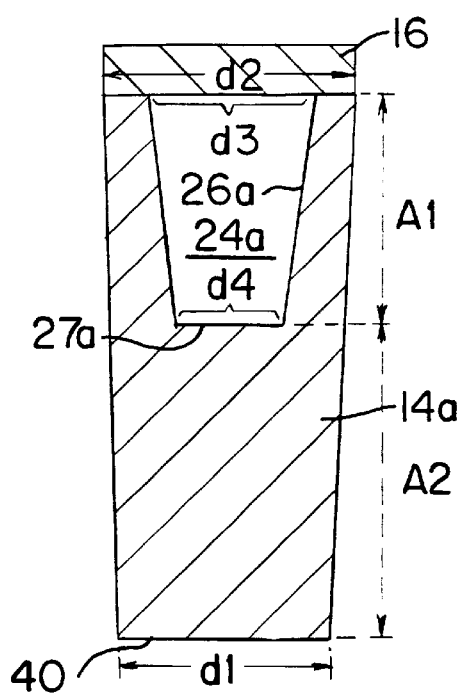
FIG. 4 is a cross-sectional view of a second embodiment of a candy product in accordance with the invention including a first type of edible cap.

FIG. 4 shows an alternative embodiment of the candy product 13 in accordance with the invention. In this embodiment, the candy product 13 includes a cylindrical base 14a having a cavity 24a defined by a downwardly oriented conical surface 26a extending from the top surface of the base 14a to an interior location of the base 14a (in the form of a truncated cone) and a flat lower wall 27a at the end of the conical surface 26a such that cross-section of the cavity 24a is trapezoidal. The cavity 24a is covered by the disc-shaped cap 28 having a diameter substantially equal to or somewhat smaller than the diameter of the top surface of the base 14a. The cap 28 has a uniform thickness and is ideally made from a candy or confectionary substance so that it is also edible. The cap 28 can be provided with a different color and/or different taste than the color and taste of the base 14a so that a variety of different flavors appealing to the child's taste and appearances appealing to the child's eyes are possible. As noted above, the incorporation of the color and taste into the confectionary material that will form the base 14a and cap 28 can be performed by any known flavoring and coloring process in the art.

In the embodiment shown in FIG. 4, the diameter d1 of the lower surface 40 of the base 14a is selected in the range of from about 10 mm to about 50 mm, the diameter d2 of the top surface of the base 14a is selected in the range of from about 7 mm to about 52 mm, and the diameter d3 of the cavity 24a at the upper surface is selected in the range of from about 5 mm to about 48 mm, thereby the remaining ring portion of the top surface of the base 14a is selected in the range of from about 1 to about 24 mm. The diameter d4 of the lower wall 27a is selected in a range from about 1 mm to about 48 mm. The distance A2 between the lower surface 40 of the base 14a and the lower wall 27a is selected in a range from about 10 mm to about 100 mm and the distance A1 between the lower wall 27a and the top surface of the base 14a is selected in a range from about 10 mm to about 65 mm. Thus, a wide variety of different confections can be made. In one specific embodiment, the diameter d1 of the lower surface 40 of the base 14a is 20 mm, the diameter d2 of the top surface of the base 14a is 24 mm, the diameter d3 of the cavity 24a at the upper surface is 16 mm so that the remaining ring portion of the top surface of the base 14a is 4 mm all around, the diameter d4 of the lower wall 27 is 10 mm, the distance A2 between the lower surface 40 of the base 14a and the lower wall 27a is 30 mm, and the distance A1 between the lower wall 27a and the top surface of the base 14a is 22 mm. In this embodiment, the cap 16 has a diameter of 23 mm and a thickness of 5 mm. However, since the dimensions of the base 14a vary, the dimensions of the cap 28 should also vary so that its diameter is selected to be substantially the same as or slightly smaller than the diameter of the top surface of the base 14a, i.e., in a range of from about 7 mm to about 52 mm, while its thickness varies in a range of from about 0.2 mm to about 50 mm.

Figure 5:
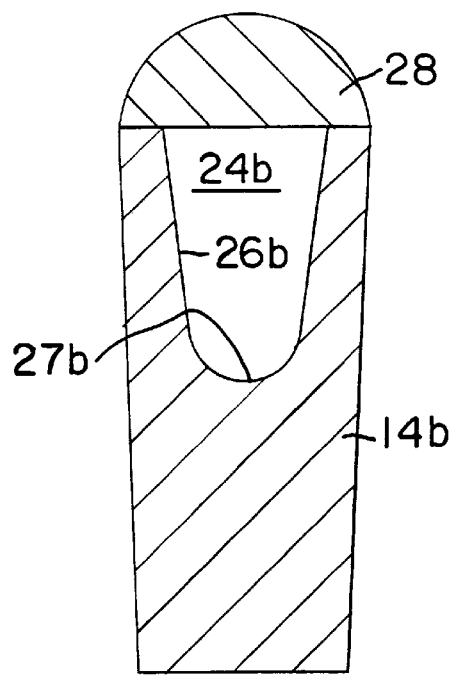
FIG. 5 is a cross-sectional view of a third embodiment of a candy product in accordance with the invention including a second type of edible cap.

FIG. 5 shows another alternative embodiment of the candy product 13 in accordance with the invention. In this embodiment, the candy product 13 includes a cylindrical base 14b having a cavity 24b defined by a downwardly oriented conical surface 26b extending from the top surface of the base 14b to an interior location of the base 14b (in the form of a truncated cone) and a rounded lower wall 27b at the end of the conical surface 26a, i.e., a hemispherical region of the cavity. The cavity 24b is covered by a rounded cap 28 which has a lower surface having a diameter substantially equal to or somewhat smaller than the diameter of the top surface of the base 14b. As noted above with respect to the disc-shaped cap 16, the rounded cap 28 is also ideally made from a candy or confectionary substance so that it is also edible.

If the rounded cap 28 is used in the embodiment of the candy product 13 having the specific dimensions described above with reference to FIG. 4, then the lower surface of the cap 28 has a diameter of 24 mm or less (so that it substantially corresponds to the diameter of the top surface of the base 14a) and a height, i.e., the distance between the lower surface and the tip, of about 10 mm. However, since the dimensions of the base 14a of the embodiment shown in FIG. 4 vary, the dimensions of the cap 16 should also vary so that its diameter is selected to be the same as or slightly smaller than the diameter of the top surface of the base 14a, i.e., in a range of from about 7 mm to about 52 mm, while its height varies in a range of from about 0.2 mm to about 50 mm.

Figure 6:
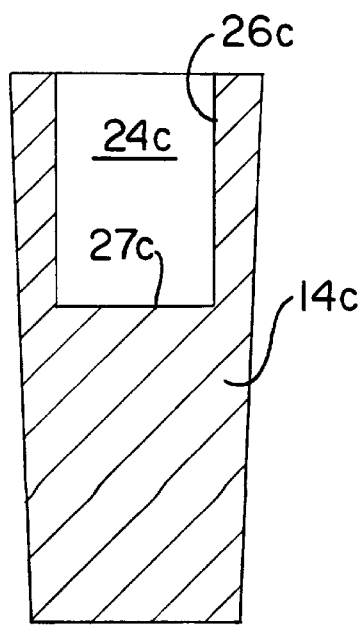
FIG. 6 is a cross-sectional view of a fourth embodiment of a candy product in accordance with the invention without an edible cap.

FIG. 6 shows still another alternative embodiment of the candy product 13 in accordance with the invention. In this embodiment, the candy product 13 includes a cylindrical base 14c having a cavity 24c defined by a cylindrical surface 26b extending from the top surface of the base 14c to an interior location of the base 14c and a flat lower surface 27b such that cross-section of the cavity 24c is rectangular. Although not shown, it should be understood that the cavity 24c may be covered either by the disc-shaped cap 16 shown in FIGS. 1, 3 and 4 or the rounded cap 28 shown in FIG. 5.

Referring now to FIGS. 8 and 9, this embodiment of the candy product is denoted generally as 100 and comprises a substantially cylindrical plastic base or holder 104, a cap 102 removably attached to one end of the base 104 and a sealing member or tap 106 removably attached to an opposite end of the base 104. Base 104 is hollow such that peripheral walls 109 thereof define an interior compartment 108 accessible through an opening 111 in the base 104.

The upper end of the base 104 includes a upraised, circular rim 119 which delineates a recess in connection with which associated support and retaining means for supporting and retaining a candy product or candy mass 103 (shown in phantom lines in FIG. 8) are provided. The rim 119 includes a projection 116 extending around an outer surface, the purposes of which is explained below. The rim 119 defines the recess which is bounded by a circular, planar surface 121 and a circular side wall 123 extending upward from a peripheral edge of the planar surface 121. The lower surface 121 includes one or more indentations 122, which may be orifices, and the side wall 121 includes one or more indentations 120 and one or more axial ridges or projections 118. The purpose of the indentations 120,122 and projections 118 is to enable a secure, fixed connection between the candy product 103 and the base 104. This is accomplished in view of the fact that the candy product 103 is placed in a liquid state into the base 104 and thus a portion of the liquid flows into the indentations 120,122 and another portion is displaced by the projections 118. Upon solidification of the candy product 103, the solid candy product 103 will remain firmly in the base 104 in view of the embedding in the indentations 120,122 and around the projections 118. Other means for securely retaining the candy product 103 in connection with the base 104 can of course be provided without deviating from the scope and spirit of the invention.

Cap 102 has a substantially cylindrical lower portion and a dome-shaped upper portion constructed so that it is open at a lower end. The cap 102 is at least partially transparent, and preferably entirely transparent, to enable the candy product 103 to be viewed without removing the cap 102 from engagement with the base 104. Cap 102 includes a clip 110 which enables the cap 102, and when connected to the base 104, the entire candy product 100, to be attached to, e.g., a garment. To further enhance the attachment to the garment, clip 110 includes an inwardly facing projection 112 which serves the decrease the space between the clip 110 and the outer surface of the cap 102 in order to more tightly clamp the garment. A ridge 114 is provided on an interior surface of the cap 102 at a lower region thereof. Ridge 114 is designed to cooperate with projection 116 on the rim 119 of the base 104 to securely yet removably connect the cap 102 to the base 104. Thus, when in the connection position, the ridge 114 is below the projection 116 to prevent the cap 102 from falling off the base 104 if the candy is turned over. However, by applying pressure to the cap 102 and/or base 104, i.e., pulling the cap 102 and/or the base 104 away from the other, it is easy to separate the cap 102 from the base 104 and thereby enable access to the candy product 103 retained on the base 104. Other cooperating fastening means for providing a secure yet removable engagement between the cap 102 and the base 104 can of course be provided.

The final component of this embodiment of the holder of the candy product 100 is the sealing member or tap 106 which is made of plastic and designed to be at least partially insertable into the opening 111 in the base 104 in order to seal the interior compartment of the base 104. The sealing member 106 is substantially circular and includes a base section 126 having a diameter substantially equal to the diameter of the outer surface of the wall 109 of the base 104 and a narrow section 124 having a diameter substantially equal to the diameter of the inner surface of the wall 109 of the base 104. The sealing member 106 is thus able to fit tightly within the opening 111 (frictionally engaged therewith) and remain there in the absence of a pressure being applied to remove it. In this manner, a small object such as a toy or ball 105 (shown in dotted lines in FIG. 8), which may constitute a "prize" for a child, may be stored within the compartment 108 of the base 104, e.g., as an added purchasing benefit. To provide easy detachment of the cap 106 from the base 104, the cap 106 includes a lens-shaped indentation 107 in the base section 126. Other cooperating means to detachably close the compartment may also be used without deviating from the scope and spirit of the invention.

In the embodiment shown in FIGS. 8 and 9, the candy product 103 is preferably a solid mass having a cylindrical or conical form. The candy mass or product may be produced in a single color or a plurality of different colors, i.e., either in different portions of the candy mass of interpersed throughout. In addition to or instead of the different colors, the candy mass may be provided with different tastes, i.e., different portions of the candy mass have a distinct taste. The selection of the different tastes and/or different colors may be determined based on the appeal to the intended consumers.

The examples provided above are not meant to be exclusive. Many other variations of the present invention would be obvious to those skilled in the art, and are contemplated to be within the scope of the appended claims. For example, with respect to the embodiment of FIGS. 1 and 4–7, other shapes, sizes and overall configurations of the cavity in the base could also be used in accordance with the invention without deviating from the scope and spirit thereof. Alternatively, the base 14 could be made entirely solid without any cavity, but possibly solely with an edible cap 16 as disclosed above. In addition, in certain embodiments, the candy product 13 does not necessarily have to be fixedly secured, embedded or otherwise securely retained in the plastic container 10, e.g., when it includes a transparent base having a candy-filled cavity. Rather, in the alternative, it is possible to fix the candy product 13 to a slidable member arranged within the plastic container 10 to slide in an axial direction of the container. In this embodiment, the amount of candy product 13 exposed to being licked or eaten, i.e., situated above the protrusion 12 on the plastic container 10, is variable simply by moving the member in the axial direction. The cap 20 is then placed over the candy product 13 when the slidable member is in its lowermost position. The slidable member can also be designed to be freely movable within the plastic container 10. In connection with the embodiment shown in FIGS. 8 and 9 in particular, the candy product does not necessarily have a cylindrical shape. Although a cylindrical form, i.e., a circular cross-section, is the illustrated embodiment, the confection may also have other product configurations and geometric shapes without deviating from the scope and spirit of the invention.

What is claimed is:

1. A confectionary product comprising:
   an edible candy product, and
   a substantially cylindrical housing for supporting and retaining said candy product, said housing comprising
      a substantially hand holdable cylindrical base having support and retaining means at a firms end of said base or supporting and retaining said candy product, an interior compartment within said base, an opposed second end of said base having an opening to said interior compartment,
      a cap removably engaging with said base at said first end, said cap being structured and arranged to enclose said candy product when sad cap is in engagement with said base, and
      a sealing member removably engaging with said base for closing said opening at said second end of said base to thereby seal said interior compartment of sad base;
   such that an article placed with said interior compartment is accessible through said second end of said base while said candy product is simultaneously supported at said first end of said base.

2. The confectionary product of claim 1, wherein said base, said cap and said sealing member each have a substantially circular cross-section.

3. The confectionary product of claim 2, wherein said opening at said opposed second end of said base is defined by an inner surface of said base, said sealing member having a substantially cylindrical base section having a diameter substantially equal to the diameter of an outer surface of said base and a substantially cylindrical upper section having a diameter substantially equal to the diameter of said inner surface of said base such that said upper section is insertable into said opening at said opposed second end of said base to frictionally engage with said inner surface of said base.

4. The confectionary product of claim 3, wherein said base section of said sealing member includes a lens-shaped indentation to facilitate detachment of said sealing member from said base.

5. The confectionary product of claim 2, wherein said support and retaining means of said base comprise a substantially circular planar surface and a circular side wall extending from a peripheral edge of said circular surface, said planar surface and said side wall having indentations in which a respective portion of said candy product is situated.

6. The confectionary product of claim 1, wherein said cap includes attachment means for enabling attachment of the confection to another article, said attachment means comprising a clip projecting outwardly from said cap.

7. The confectionary product of claim 1, wherein said cap is at least partially transparent to enable viewing of said candy product.

8. The confectionary product of claim 1, wherein said cap and said base include cooperating attachment means for removably attaching said cap to said base.

9. The confectionary product of claim 8, wherein said base and said cap have a substantially circular cross-section, said cap having an inner surface and said base having an upraised, circular rim at said first end, said cooperating attachment means comprising a ridge arranged on said inner surface of said cap and a projection arranged on said rim of said base, said ridge and said projection being structured and arranged such that said ridge passes over said projection when said cap is secured to said base.

10. The confectionary product of claim 1, further comprising a small toy situated entirely in said interior compartment of said base.

11. The confectionary product of claim 1, wherein said candy product comprises a mass of candy having at least one of plurality of different tastes and a plurality of different colors.

12. The confectionary product according to claim 1, wherein said retaining means comprises a substantially circular planar surface and a circular side wall extending from a peripheral edge of said circular surface, said planar surface and said side wall having indentations in which a respective portion of said candy product is situated.

* * * * *